United States Patent Office.

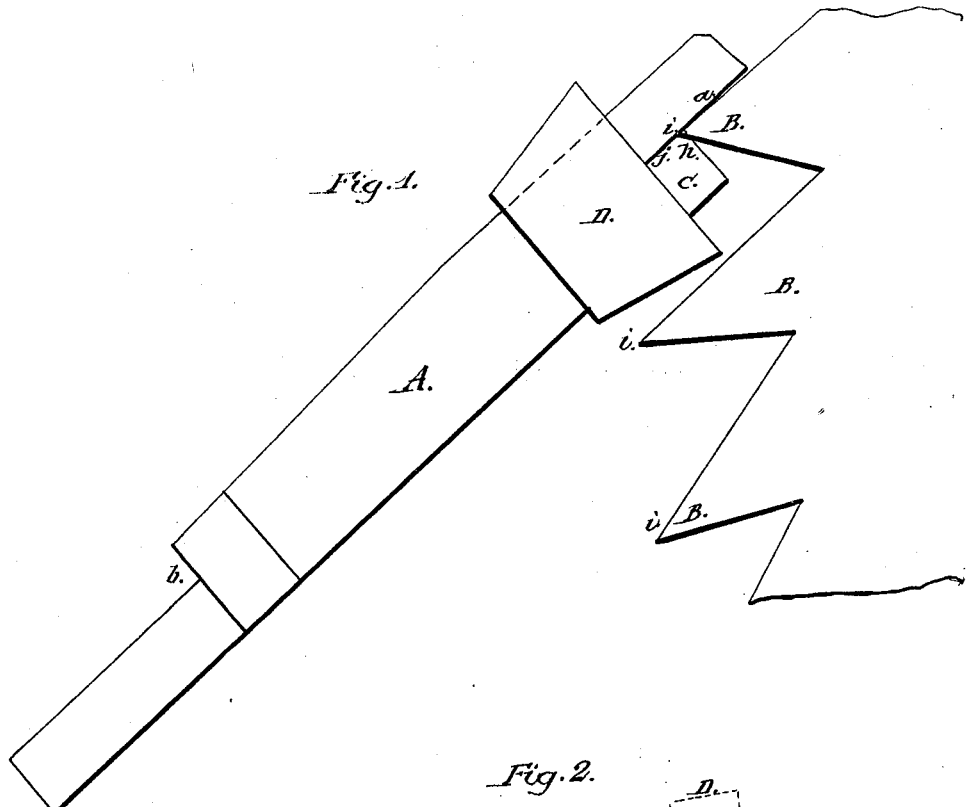

JOHN McDONALD, OF PORTVILLE, NEW YORK.

Letters Patent No. 92,076, dated June 29, 1869.

---

IMPROVEMENT IN SAW-SWAGE.

---

The Schedule referred to in these Letters Patent and making part of the same.

---

*To all whom it may concern:*

Be it known that I, JOHN MCDONALD, of Portville, in the county of Cattaraugus, and State of New York, have invented a certain new and useful Improvement in Swages for Spreading the Under Side of the Teeth at the Point, for Sharpening Mill, Circular, and other Saws; and the following is a full, clear, and exact description of the same, reference being had to the accompanying drawings, making a part of this specification, in which—

Figure 1 represents the apparatus as applied to a tooth on the section of a large circular saw.

Figure 2 shows two views of the stock-swage and slide-punch, with the spring inside, as constructed complete for operation.

The object of my invention is to spread the points of saw-teeth on their under side uniformly and truly, and make them of a sufficient width to avoid the necessity of any other setting or filing on the under side.

My invention consists in the construction of the stock, with the sliding punch, whose bevel face, in combination with the gauge-face of the stock, gives the form and spreads the point of the tooth on its under side, and sets and sharpens the saw at the same time.

That others may be enabled to make and use my invention, I will describe it more fully, referring to the drawings, and to the letters marked thereon.

I make the stock A of cast or wrought-iron, or steel, it being provided with an offset, *a*, to form the face of the portion that rests on the top of the saw-tooth B.

The sliding punch C is fitted into a groove, *b*, in the stock A, the bottom of which is on a direct line with the face *a* in the offset, so that the punch C fits closely and slides on the face, and is held firmly against it by a strong metal socket, D, through which the punch C slides, and is provided with a helical spring, *d*, placed in recesses *e*, in both the stock and punch, to hold the punch C against the shoulder *f* of the offset *a*.

The punch C has the corner taken off at any desired angle to form a bevelled face, *h*, where its operating portion rests against the gauge-face *a* in the offset, which bevel or angle gives the precise form or shape to the point *i* of the saw-tooth B, and swages or spreads out both ways the point of the tooth on the under side, where the concussion of the blow is brought to bear by the action of a hammer on the other end of the punch E.

The point *i* of the tooth, coming in the joint *j*, meets with no obstacle, and is thus brought to a fine, sharp edge. At the same time the tooth is being spread out sideways sufficiently to make it cut clear, so that no other setting to the saw is required, and no filing on the under side of the teeth, and much less on the top, as the swaging not only gives the teeth a uniform, nice, sharp cutting-edge, but it also hardens and tempers them, so that they will retain their cutting-edge much longer than when the points are left from the file.

What I claim as my invention, and desire to secure by Letters Patent, is—

The sliding punch C, whose bevel-face *h* is in contact with the gauge-face *a*, in combination with spring *d*, substantially as and for the purposes set forth.

In testimony whereof, I hereunto subscribe my name, in the presence of—

JOHN McDONALD.

Witnesses:
W. H. STENSON,
I. F. GLEASON.